(12) United States Patent
Tanaka et al.

(10) Patent No.: US 6,769,819 B2
(45) Date of Patent: Aug. 3, 2004

(54) OPTICAL DEVICE MODULE

(75) Inventors: Tsuyoshi Tanaka, Yokohama (JP); Daisuke Komada, Kitami (JP); Shiro Yonekura, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/821,539

(22) Filed: Mar. 28, 2001

(65) Prior Publication Data

US 2001/0026664 A1 Oct. 4, 2001

(30) Foreign Application Priority Data

Mar. 28, 2000 (JP) .................................. P 2000-089544

(51) Int. Cl.[7] .............................................. G02B 6/42
(52) U.S. Cl. ...................................................... 385/92
(58) Field of Search ............................ 385/88–94, 138

(56) References Cited

U.S. PATENT DOCUMENTS

| | | | |
|---|---|---|---|
| 4,902,091 A | * | 2/1990 | Althaus et al. |
| 4,997,243 A | * | 3/1991 | Aiki et al. |
| 5,155,786 A | * | 10/1992 | Ecker et al. ................. 385/94 |
| 5,570,444 A | * | 10/1996 | Janssen et al. ............... 385/90 |
| 5,619,609 A | | 4/1997 | Pan et al. .................... 585/136 |
| 5,727,105 A | * | 3/1998 | Nagata et al. ................ 385/94 |
| 6,190,056 B1 | * | 2/2001 | Kwon et al. .................. 385/91 |
| 6,312,165 B1 | * | 11/2001 | Yeandle et al. ............... 385/88 |

* cited by examiner

Primary Examiner—Akm Enayet Ullah
Assistant Examiner—Mike Stahl
(74) Attorney, Agent, or Firm—Hogan & Hartson, LLP

(57) ABSTRACT

An optical device module is provided which includes an optical device, an optical fiber an end of which is optically coupled to the optical device, a package containing the optical device and the optical fiber, and an insertion tube fixed air-tightly through the wall of the package, the optical fiber extending through the insertion tube out of the package, wherein the end portion of the optical fiber is offset with respect to the fixed portion, by the insertion tube, of the optical fiber to bend the optical fiber between the end portion and the fixed portion of the optical fiber, then avoiding the displacement of the end of the fiber to be coupled to the optical device due to a change in environment temperatures of the module, and minimize the temperature dependence of device performance. Further, the optical device module may be fabricated such that the end portion of the optical fiber is fixed to a ferrule which is fixed to a ferrule holder which is capable to be deformed plastically, whereby the optical axes of the optical device and the end of the optical fiber can readily be adjusted accurately after assembly.

12 Claims, 4 Drawing Sheets

Fluctuation of the optical fiber output(%)

Result of the mechanical impact test

OPTICAL DEVICE MODULE

FIELD OF THE INVENTION

The present invention relates to an optical device module, for example, for use of optical communication, and particularly to the fixing structure of the optical fiber, which is inserted into a package of the module.

BACKGROUND OF THE INVENTION

Optical device modules including semiconductor laser devices, Photo-diode devices and optical receiving devices, have widely been used in optical communication systems. A structure of fixing the optical fiber in a package of the optical device module has been known in prior art. Such a structure is disclosed in FIGS. 5 and 6 in U.S. Pat. No. 5,619,609.

FIG. 5 is a cross sectional view of a main part of an optical device module including a package 2 made of metal or ceramic material, an optical device 1, such as a semiconductor laser device, mounted on a stem 8 inside the package 2, and an optical fiber 4 which is arranged in the package and passes through an insertion tube 3 fixed through the wall 21 of the package 2

A ferrule 5 is fixed on the stem 8 to holding an end portion of the optical fiber and the optical fiber extends form the ferrule 5 to an outer side of the package 2 through a through-hole 6 of the insertion tube 3. The ferrule 5 is adjusted to align the optical axis of the optical fiber 4 to the optical axis of the optical device 1, so that the ferrule 5 is fixed via a ferrule holder 7 to the stem 8.

In general, in the module where a semiconductor laser must be aligned precisely to the optical fiber on a single optical axis, when the optical fiber 4 is fixed by soldering directly to any fiber holder, the axis of the optical fiber often displaces over 10 μm from the original optical coupling point of the laser emission device. As a result, the laser output from into optical fiber largely is reduced. The soldering structure of the fiber makes it difficult to readjust correct optical fiber position, therefore, avoiding ferrules from directly being soldered. Also adhesives can not be employed in the package 5, because adhesives generate organic gas has a fear of lowering the life time of semiconductor laser devices. Thus, the optical fiber 4 is laser welded and fixed through the ferrule 5.

The stem 8 is usually installed on a thermoelectric cooling element 9 for controlling the temperature of the optical device 1.

The insertion tube 3 and the optical fiber 4 are metalized by gold plating, etc, and the solder is poured into a soldering gap 10 of the insertion tube 3 so that the package is air-tightly sealed. The optical fiber 4 is fixed between the ferrule 5 and the airtight sealing portion of the insertion tube 3 in such a manner that the optical fiber is linear and substantially parallel with respect to the optical axis.

In FIG. 6 showing the ferrule fixing structure in FIG. 5, the ferrule 5 and the ferrule holder 7 are positioned to optically align the optical fiber 4 to the optical axis of the optical device, and then the ferrule holder 7 is fixed onto the stem 8 with the ferrule 5 fixed on the ferrule holder 7, by laser welding. The conventional ferrule holder 7 has a U-shaped groove portion 12 and flange portion 11 on both sides of the groove machined by a milling cutter from a metal block. As shown in FIG. 6, the flange portion 11 is directly laser-welded onto an upper surface of the stem 8 and the ferrule 5 is fillet welded onto both edges of the U-shaped groove portion 12.

FIG. 7 shows a cross-sectional view of a prior art optical device module having an optical fiber disposed in a bending manner in a package. The optical fiber 4 is supported at its end portion by a first ferrule 5 on a stem 8, and held on a rear side thereof by a second ferrule 13 which is disposed within an insertion tube 3 through a wall of the package 2.

The first ferrule 5 is fixed on a ferrule holder 7 which is fixed on a stem 8 by laser welding. Then the second ferrule 13 is inserted through an insertion tube 3 from the outside thereof and is pushed into tho inside of the package 2. To seal the package air-tightly, the optical fiber 4 is soldered to the second ferrule 13.

In this packaged optical fiber, the optical fiber is bent in the form of arc between the first ferrule 5 and the second ferrule 13. Such a second ferrule 13 is necessary as a member fixing the end of the fiber for bending the optical fiber 4 in the package 2.

The conventional optical device module, as shown in FIGS. 5 and 6, has drawbacks due to the structure of the optical fiber 4 in the package 2 fixed so as to be linear and substantially parallel to the optical axis. Therefore, changes in environmental temperature cause the package 2 to expand or contract, and male the optical fiber 4 in the package 2 suffer from a tensile or compressive stress, causing the swinging of the end surface of the optical fiber 4 to be coupled to the optical device.

An first problem is that the output transmitting from the optical emission device to the optical fiber fluctuates and that the optical fiber tends to deteriorate the optical performance by vibration. A second problem is that separation of the soldering material from the optical fiber in the insertion tube 3 is caused by the repeated tensile and compressive stress between the ferrule holder 7 and insertion tube 3, leading to insufficient airtight sealing. No easy or secure airtight sealing can be achieved, particularly, by the enlarged length between the insertion tube 3 and the optical fiber 4.

Although the optical device module in prior art, as shown in FIG. 7, can solve the first problem by bending the optical fiber 4 in the packager 2, the optical device module requires a second ferrule 13 as a fixing member, or grip for bending the optical fiber 4. In addition, airtight sealing between the optical fiber 4 and second ferrule 13 is required, as well as sealing between second ferrule 13 and the insertion tube 3 of the package. Such double airtight sealing structure may deteriorates production efficiency with low production yield. As a result, this structure of optical device modules can not solve the above second problem.

SUMMARY OF THE INVENTION

An object of the present invention is to provide an optical device module in which an optical fiber can derive optical output stablly from an optical device packaged in the module, even in use under the circumstances of the package extending or contracting due to environmental temperature changes.

Another object is to provide an optical device module having an easy and secure airtight sealing structure which can decrease in the number of the fabricating steps, and increase in productivity of the modules.

According to the present invention, an axis of an optical fiber at the end portion whose end surface is coupled to an optical device is offset with respect to an axis of the optical fiber at a fixing portion where the fiber is fixed through a wall of a package which contains the optical device and the part of the fiber so as to bend the optical fiber in a region of between the end portion of the fiber and the fixing portion within the package.

The offset between of the axis of the optical fiber at the end portion and the axis thereof at the fixing portion allows the optical fiber to naturally bend, and then the bent fiber can absorb the expansion and contraction of the package length due to the temperature change of the environment, resulting in preventing effectively fluctuation output of the optical fiber and deterioration of the optical fiber.

In the present invention, preferably, a ring member having an fiber inserting hole can be inserted co-axially into an insertion tube fixed through the wall to hold the optical fiber, and then the fiber, ring member and insertion tube can be sealed to each other to obtain good airtight seal.

In the present invention, a ferrule for holding the end portion of the optical fiber may be fixed to a ferrule holder capable of being deformed plastically in the package. After fixing the optical fiber, the plastic deformation of the ferrule holder enables the optical axis of the optical fiber to optically align to an emission end of the optical device.

The optical device in the optical device module according to the invention includes a semiconductor optical emission or reception device, such as a semiconductor laser emission device, photo-diode device.

DETAILED DESCRIPTION OF THE INVENTION

Figure 1:
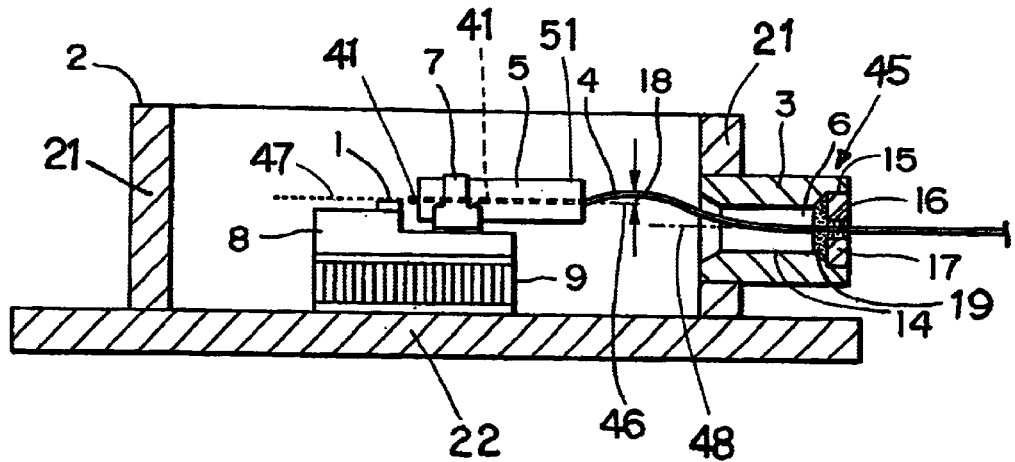
FIG. 1 is a vertically cross-sectional view of an optical device module of an embodiment according to the present invention.

An embodiment of the present invention is described below, referring to the drawings. In FIG. 1, an insertion tube 3 for inserting an optical fiber 4 therethrough is fixed through the wall 21 of a package 2 by soldering therebetween. In general, the package 2 of an optical device module, which requires airtight sealing, is made of ceramic material or Kovar alloy.

In this example, the wall 21 surrounding rectangular is made of Kovar, and the bottom plate 22 supporting the wall 21 and optical device 1 is made of alumina which is suitable for wiring leads to terminals from the optical device 1 thereon.

The material of the insertion tube 3 may be identical, or may have a substantially identical expansion coefficient, to that of the package 2 to avoid cracking joined portions between the package 2 and the insertion tube 3 which would take place due to a change in environmental temperature. An optical device 1 such as semiconductor laser is installed in the package 2. An optical fiber 9 is provided within the package 2 to connect to the optical device 1 and introduce through the wall 21 of the package 2 outward, and for fixing the fiber, a ferrule 5 is disposed at an end portion 41 of an optical fiber 4 and soldered to the optical fiber 4 by Au—Sn alloy solder.

The optical fiber 4 having such a ferrule may be introduced into the inside of the package 2 through an insertion hole 6 of the insertion tube 3. In the package, he end surface 40 of the optical fiber 4 is adjusted to align to the optical axis 46 of the optical device 1 fixed on a stem 8 so that an optical coupling therebetween can be achieved.

In this embodiment, the ferrule holder 7 is fixed to a stem 8 by welding on the base plate 22 of the package and the fiber ferrule 5 is fixed by welding to the ferrule holder 7.

The stem 8 is disposed on a thermoelectric cooling element 9 for controlling the temperature of the optical device 1.

The insertion tube 8 has a through insertion hole 6 made up of two parts; the first part 14 has a first diameter sufficiently large to pass the ferrule 5 therethrough in assembling; and, the second part 15 has a second diameter larger than that of the first part. A ring member 17 is engaged into the second part 15, and therefore, the outer diameter of the ring member 17 is a little smaller than inner diameter of the second part 15. The ring member 17 has a fiber insertion hole 16 at the center of its outer surface, through which the optical fiber passes. The diameter of the fiber inserting hole 16 is a little larger than that of the optical fiber. The ring member 17 may be made of a material having an expansion coefficient substantially identical to that of the insertion tube 3.

Figure 5:
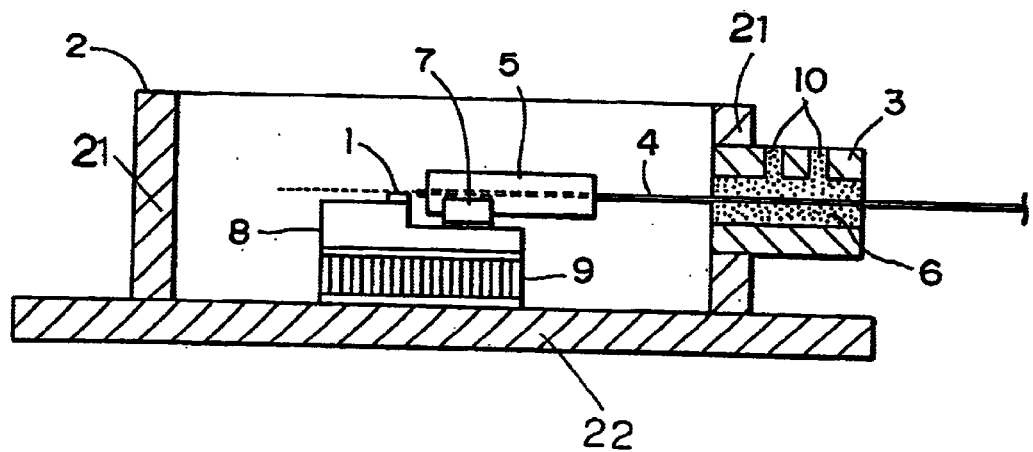
FIG. 5 is a vertical cross-sectional view showing an conventional optical device module.
Figure 6:
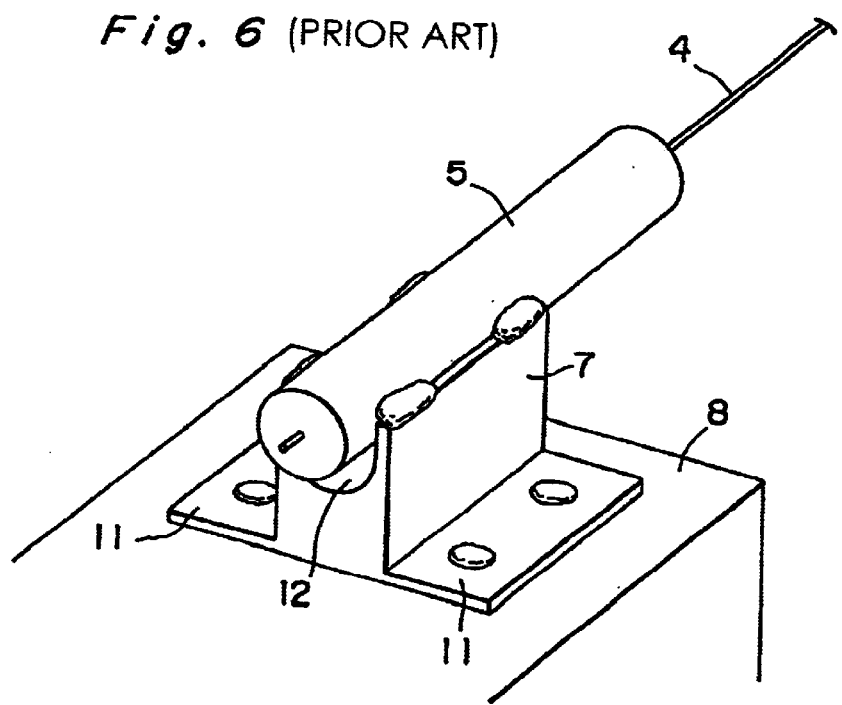
FIG. 6 is an enlarged, perspective view showing a portion for fixing a ferrule of the conventional optical device module.
Figure 7:
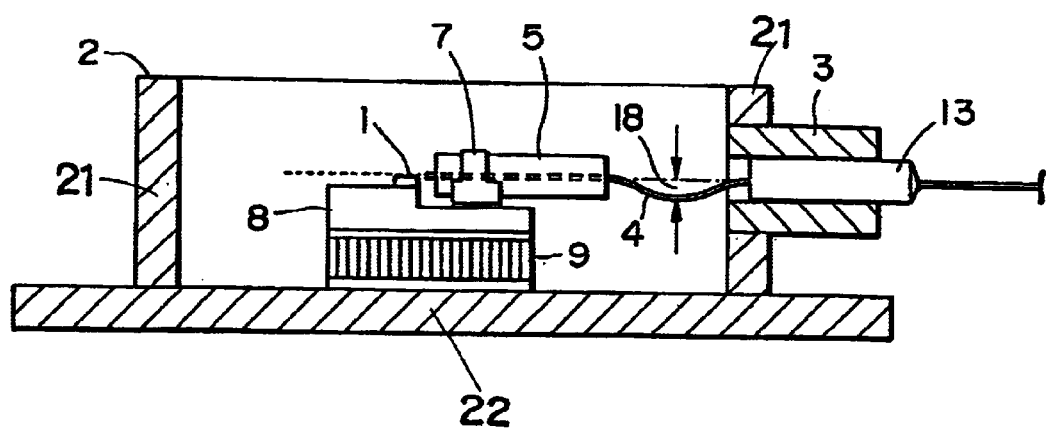
FIG. 7 is a vertical cross-sectional view showing a main part of another optical device module in the prior art.
Description of the special embodiments

The insertion tube 3 fixed through the wall 21 of the package 2 is disposed such that the center axis of the ring member 17 is positioned lower than the optical axis 47 of the optical device 1. The insertion tube 3, ring member 17 and optical fiber 4 are joined to each other by solder material 19 fused using high frequency induction heating, then sealed air-tightly with each other. This fixing structure allows the optical fiber 4 in the package 2 to be bent naturally in a vertical plane due to the offset between the end portion 41 of the optical fiber 4 which is fixed in the ferrule 5 and the fixed portion of the optical fiber 4, at the fixing portion 45, which is sealed in the fiber insertion hole 6 at the center of the ring member 17. Generally, as noted above, changes in environmental temperature in use cause the package to be expanded and contracted, resulting in tensile or compressive stress to a straightened optical fiber 4 as shown in FIG. 5 in the package 2. However, in the embodiment of the present invention, the bending portion so formed along the optical fiber 4 can absorb the stress, and can effectively suppress the out-put fluctuation from the optical fiber, and at the same time the module can easily and securely be air-tightly sealed.

Figure 2:
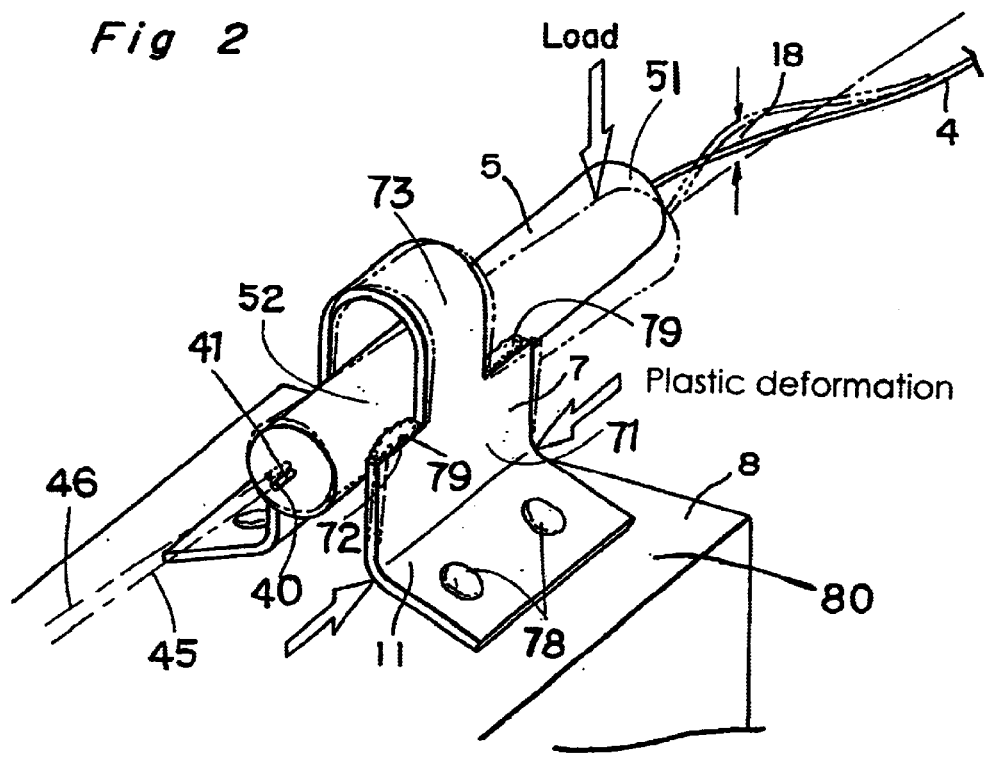
FIG. 2 is an enlarged, perspective view showing a portion for fixing a ferrule in the optical device module of an embodiment according to the present invention.

FIG. 2 shows a ferrule-fixing portion in the optical device module 1 according to the present invention. The ferrule holder 7 is made of a thin plate and is bent into a U shape, in the form of a clip. The ferrule holder 7 has a flange portion 11 previously welded onto the stem 8. The flange portion 11 is disposed non-parallel to the upper surface of the stem 8, but is a little inclined with a gap between the flange and stem surface, i.e., the flange portion increases in height toward the center side of the ferrule 5. In other words, the flange portion 11 is floated to enable the ferrule holder 7 to be plastically deformed up or down.

The ferrule 5 is chucked at the front side thereof by the ferrule holder 7 which is previously fixed onto the stem 8, and then the ferrule 5 is welded to the ferrule holder 7 by a YAG-laser welder, with the laser beam being emitted between body sides of the ferrule 5 and shoulder portions of the ferrule holder 7 downwardly from a position upper than the package 2 to form welded metal between them. By thermal shock of YAG-laser welding, the front side of the ferrule 5 and the end portion 41 of the optical fiber 4 sink with respect to the optical axis 47 of the optical device 1, namely the optical coupling between the optical device 1 and optical fiber 4 being mismatched. For correcting to proper optical coupling between the optical device 1 and the optical fiber 4, a load is applied downwardly to the rear side 51 of the ferrules 5, i.e., at the portion opposite to the end surface 40 of the optical fiber 4, to force the flange 11 to plastically deform and to lower the rear position 51 of the ferrule 5, as shown in double-dot dashed lines in FIG. 2, so that the optical axis 46 of the optical fiber 4 is moved to be re-aligned properly to the optical axis 47 of the optical device 1. Also, the arc 18 of the optical fiber 4 is optimized about the fixed portion of the optical fiber 4 at the fixing portion 45 in the insertion hole 6 of the package 2.

The downward displacement of the rear side 51 of the ferrule 5 makes the curve of the optical fiber 4 depict an arc 18 which, starting from the rear side of the ferrules 5, at first rises upwardly and later descends down to reach to the airtight sealing portion of the ring member 17.

When changes in environmental temperature, in use, provides an expansion or compression for the package 2, though such expansion or compression in turn might cause a tensile or compressive stress to a straightened optical fiber the end portion of which is fixed as shown in FIG. 5, in the present invention, this supporting structure of the optical fiber in the package 2 can absorb such stress sufficiently to suppress the deviation of the optical fiber.

EXAMPLES

An example of the structure of an optical device module, which includes a semiconductor laser emission device as an optical device, is described below, referring to FIGS. 1 and 2.

An insertion tube 3 made of Kovar material (Fe—Ni alloy) for inserting an optical fiber 4 is fixed to a package 2, which is also of Kovar alloy material, by silver alloyed solder, as shown in FIG. 1. There is found a thermoelectric cooling element 9 for controlling the temperature of the semiconductor laser 1 in the package 2, which is soldered to the package 2. A stem 8 made of Kovar alloy is installed and soldered on the thermoelectric element 9. And an optical device 1, i.e., a semiconductor laser, is installed and soldered onto the stem 8. For holding the optical fiber 4, a ferrule 5 having an outer diameter of 1 mm is previously provided to the end portion of the optical fiber 4, and is Au/Sn soldered thereto.

The ferrule 5 and the optical fiber 4 are introduced from the outside of the package 2 into the inside thereof through the insertion hole 6 of the insertion tube 3.

The end portion 40 of the optical fiber 4 is adjusted such that the end surface 40 of the optical fiber 4 is optically coupled precisely to the light emission part of the semiconductor laser 1, by aligning the axis 45 of the optical fiber 4 being optically to the optical axis 47 of the semiconductor laser device 1. Then, the ferrule holder 7 is laser welded onto the stem 8 with welded metal 19, and the ferrule 5 is also laser welded onto the ferrule holder 7 with welded metal 78, as shown in FIG. 2.

The insertion hole 6 comprises two portions. The first portion has a first diameter of 1.4 mm, which is sufficiently large for inserting a ferrule 5 having an outer diameter of 1 mm. The second part 15 has a second diameter of 1.8 mm, which is larger than that of the first portion. A ring member 17 is inserted into the second portion 15. The ring member 17 is made of Kovar material and has a thickness of 0.7 mm. The outer diameter of the ring member 17 is 1.76 mm, which is a little smaller than that of the second part 16. The ring member 17 has a fiber insertion hole 16 at the center thereof. The diameter of the fiber insertion hole 16 is 0.16 mm, which is a little larger than that of the optical fiber 4. The insertion tube 3, ring member 17 and a part of the optical fiber 4 has been metalized with gold. Thus, applying a single process of soldering could incorporate these components integrally with completely airtight sealing obtained.

The insertion tube 3 is fixed to the package 2 so that the central axis of the ring member 17, through which the optical fiber passes, is off-centered downwardly by a distance of about 0.4 mm compared to that of the semiconductor laser 1. Therefore, the optical fiber 4 in the package 2 is naturally curved in a vertical plane.

In order that the tensile or compressive stress in the optical fiber, due to the expansion or contraction along the package, may be lowered two third the expansion or contraction of an unbent, straightened optical fiber in the module, the offset was designed to be over 0.3 mm which is defined as the vertical distance between the optical axis 46 of the optical fiber 4 after the rear portion 51 and the axis 48 of the fiber 4 at the fixing portion 45 extending to the central axis of the insertion tube 3. Further, the offset may be set to be lower than 1 mm to avoid the optical fiber losing its optical energy due to the curvature of the optical fiber.

Referring to FIG. 2, the ferrule holder 7 is made of a Kovar plate having thickness of 0.15 mm, length of 4 mm and width of 2 mm, and is bent in the form of a clip. The ferrule holder 7 has a flange portion 11 which is not parallel to the plane of the stem 8 but is a little floating toward the center axis of the ferrule 5. There is provided a gap between the flange portion 11 and the upper surface of the stem 8, and the gap increases a little toward the center axis. The flange portion 11 is through-hole-welded to the stem 8 in the floating state. When the ferrule 5 is YAG welded to the ferrule holder 7, the ferrule 5 is chucked at the side opposite to the side facing to the end of the optical fiber 4.

In welding by YAG-laser beams emitted downwardly from a position over the package 2, the end portion of the optical fiber 4 tends to sink downward with respect to the optical axis of the semiconductor laser 1 due to the shock of the YAG laser. A force of about 0.1 kgf is applied downwardly at the rear side of the ferrule 5 to optically re-align the optical fiber 4 to the optical axis of the semiconductor laser 1. The force applied at a rear side of the ferrule 5 on opposite side to the end of the optical fiber 4 force a stress of about 45 kgf/mm$^2$ to the flange portion 11 of the ferrule holder 7 to plastically deform flange portion of the ferrule holder 7. As a result of the plastic deformation, the optical coupling between the optical fiber and the semiconductor laser is recovered completely, and simultaneously, the optical fiber 4 forms a curve, which has an axis, at the fixing portion 45, of the optical fiber 4 in the insertion hole 6 of the package 2. The curved fiber rises upwardly to form an arc 18, and achieves a height of about 100 to 200 $\mu$m over the optical axis, the optical fiber 4 floating over the optical axis. The arced fiber absorbs the tensile or compressive stress taking place in the optical fiber. Even though such stresses may appear due to the expansion or contraction of the package 2, caused by the temperature change of the environment while the optical device module is used, the bending fiber structure of the invention can suppress effectively the fluctuation of the optical output between the optical device and the optical fiber.

The region of changing in environmental temperature where an optical device module for use of optical communication can be used, has been regulated to be from—40° C. to 85° C. in this rating temperature region, the end of the optical fiber coupled to the optical device module according to the present invention has the tolerance of displacement of about 2 μm in the optical direction. Thus, it is preferable that a height of the arc may he more than 100 μm from the optical axis at the fiber fixing portion 45, then, allowing the end portion of the optical fiber to displace and to avoid the misalignment to the optical axis.

Figure 3:
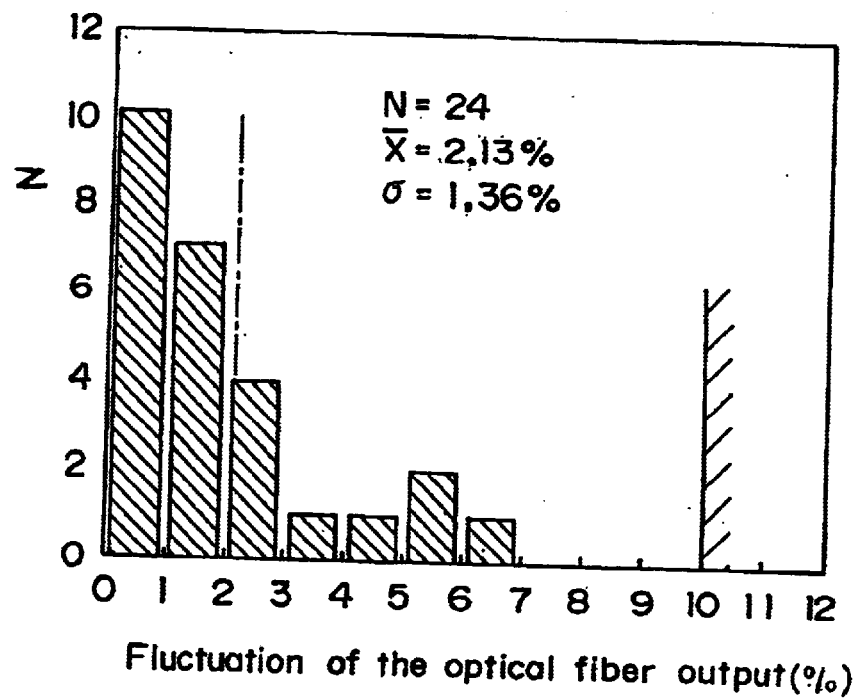
FIG. 3 is a histogram showing measured fluctuation amounts of the optical fiber output of the present invention, when the temperature of the environmental in use changes.

FIG. 3 is a histogram showing amounts of measured fluctuation in optical fiber output of the above optical device module according to the present invention with respect to the environmental temperature changes. The optical fiber output is measured in the range of the package temperatures of −40° C. to 85° C., based on the reference output obtained in the condition that the temperature of the semiconductor laser 1 is controlled to be constant, at 25° C. by the thermoelectric element 9 with the package temperature of 25° C. A fluctuation amount of the optical fiber output is the difference of the actually measured optical fiber output from the reference output at 25° C. as noted above.

The histogram in FIG. 3 shows the differential fluctuation amounts between those fluctuation amounts measured at temperatures of minimum −40° C. and maximum +85° C. The fluctuation amounts are shown by the higher of the fluctuation amounts measured at −40° C. and +85° C.

In general, the fluctuation amount of the optical fiber output is regulated to be in the range of ±10% for a semiconductor laser module for use of optical communication. The result of these tests for 24 samples exhibits the mean value of the output loss of 2.1%, and the maximum value less than 7%. These result shows that all the samples satisfy the regulated fluctuation standard.

Figure 4:
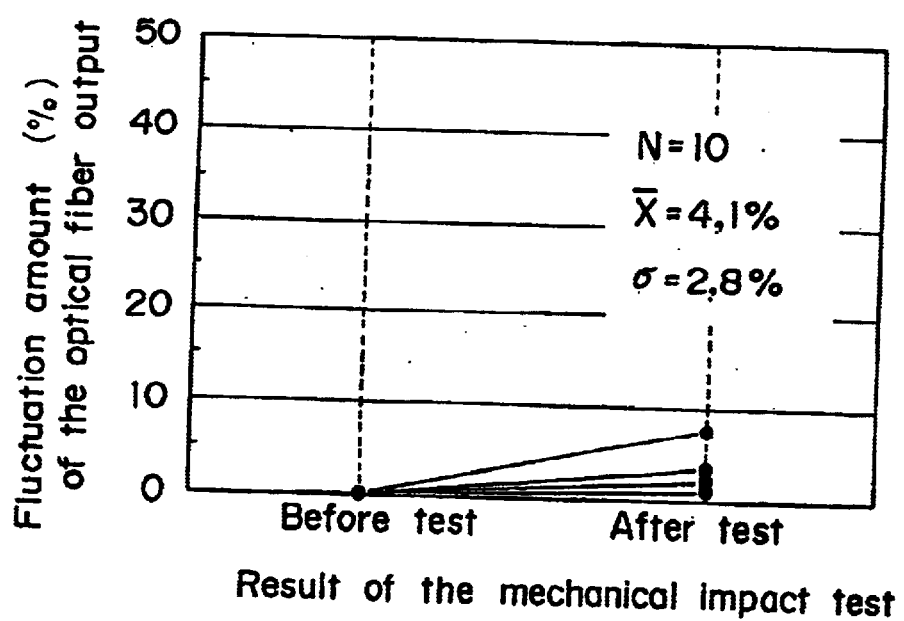
FIG. 4 is a graph showing the measured fluctuation amounts of the optical fiber output of the present invention, before and after a mechanical impact test.

FIG. 4 is a graph showing the fluctuation amounts of the optical fiber output of an optical device module according to the present invention, which were measured before and after a mechanical impact test. The mechanical impact test was carried out according to the test method of microelectronics defined by MIL-STD-883C, method 2002.3. The test condition was as follows: the impact pulse is 1500 g; the pulse width is 0.5 ms; and 6 axes×5 times. The result of the pulse test for ten samples showed that the mean value of the fluctuation amounts of the optical fiber output was 4.1%, with the maximum value of the fluctuation amounts of the optical fiber output being 7.6%, then satisfying the defined requirement of the range of ±10%.

It is found that because the ferrule 5 itself is light in weight and so that the flange portion 11 of the ferrule holder 7 is loaded below 10 kgf under this test condition, the optical device module of the invention can sufficiently endure the mechanical impact.

What is claimed is:
1. An optical device module comprising:
an optical device;
an optical fiber, an end portion of which is optically coupled to the optical device;
a package containing the optical device and the optical fiber; and
an insertion tube fixed through the wall of the package, the optical fiber extending through the insertion tube out of the package,
wherein the end portion of the optical fiber is offset with respect to a fixed portion of the optical fiber, which fixed portion is below the end portion and which fixed portion is sealed within the insertion tube, to bend the optical fiber between the end portion and the fixed portion of the optical fiber,
wherein an axis of the fixed portion is parallel to an axis of the end portion, and
wherein a ring member having a through hole for inserting the optical fiber is inserted co-axially within the insertion tube and sealed with the insertion tube by soldering, through the ring member.

2. An optical device module comprising:
an optical device;
an optical fiber, an end portion of which is optically coupled to the optical device;
a package containing the optical device and the optical fiber; and
an insertion tube fixed through the wall of the package, the optical fiber extending through the insertion tube out of the package,
wherein the end portion of the optical fiber is offset with respect to a fixed portion of the optical fiber, which fixed portion is below the end portion and which fixed portion is sealed within the insertion tube, to bend the optical fiber between the end portion and the fixed portion of the optical fiber,
wherein an axis of the fixed portion is parallel to an axis of the end portion, and
wherein the end portion of the optical fiber is fixed through a ferrule which is fixed to a ferrule holder capable of being deformed plastically.

3. The optical device module according to claim 1, wherein the optical device is a semiconductor laser.

4. The optical device module according to claim 1, wherein the ring member is made of Kovar material.

5. The optical device module according to claim 1, wherein the ring member has a thickness of 0.7 mm.

6. The optical device module according to claim 1, further comprising a thermoelectric cooling element.

7. The optical device module according to claim 2, wherein the end portion of the optical fiber is soldered to the ferrule by Au—Sn alloy solder.

8. The optical device module according to claim 2, wherein the ferrule holder is bent into a U shape.

9. The optical device module according to claim 2, wherein the ferrule holder is made of a Kovar plate.

10. The optical device module according to claim 2, wherein the ferrule holder has a thickness of 0.15 mm.

11. The optical device module according to claim 2, further comprising a thermoelectric cooling element.

12. The optical device module according to claim 2, wherein the optical device is a semiconductor laser.

* * * * *